(12) United States Patent
Albers et al.

(10) Patent No.: US 8,342,560 B2
(45) Date of Patent: Jan. 1, 2013

(54) COUPLING LOCK FOR A TRAILER COUPLING

(75) Inventors: Ingo Albers, Bad Essen (DE);
Christoph Elbers, Stemwede (DE);
Joachim Spratte, Osnabrueck (DE);
Katharina Matzold, Hunteburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/318,824

(22) PCT Filed: Jun. 17, 2010

(86) PCT No.: PCT/DE2010/050038
§ 371 (c)(1),
(2), (4) Date: Nov. 4, 2011

(87) PCT Pub. No.: WO2010/145646
PCT Pub. Date: Dec. 23, 2010

(65) Prior Publication Data
US 2012/0112434 A1 May 10, 2012

(30) Foreign Application Priority Data
Jun. 19, 2009 (DE) .......................... 10 2009 027 036

(51) Int. Cl.
*B60D 1/06* (2006.01)

(52) U.S. Cl. ..................................... 280/511

(58) Field of Classification Search ................. 280/507, 280/504, 511
See application file for complete search history.

(56) References Cited

U.S. PATENT DOCUMENTS

| 4,627,633 | A | * | 12/1986 | Gehman et al. | 280/432 |
| 5,152,544 | A | | 10/1992 | Dierker, Jr. et al. | |
| 5,558,350 | A | * | 9/1996 | Kimbrough et al. | 280/426 |
| 6,879,240 | B2 | * | 4/2005 | Kruse | 338/12 |
| 6,956,468 | B2 | * | 10/2005 | Lee et al. | 340/431 |
| 7,159,890 | B2 | * | 1/2007 | Craig et al. | 280/511 |
| 7,570,047 | B2 | * | 8/2009 | Stuve et al. | 324/207.2 |
| 7,762,736 | B2 | | 7/2010 | Ersoy et al. | |
| 2006/0071448 | A1 | | 4/2006 | Craig et al. | |
| 2007/0040355 | A1 | * | 2/2007 | Spratte et al. | 280/511 |

FOREIGN PATENT DOCUMENTS

| DE | 103 34 000 A1 | 2/2005 |
| EP | 0 433 858 A2 | 6/1991 |
| WO | 2006/133682 A2 | 12/2006 |

* cited by examiner

Primary Examiner — Tony Winner
(74) Attorney, Agent, or Firm — Davis & Bujold, PLLC

(57) ABSTRACT

A coupling lock for a trailer coupling. The coupling lock comprises a receptacle (9) in which a coupling element (6) is inserted, an angle measuring device (13, 19) is connected to the receptacle (9), and the angle measuring device (13, 19) is provided for detecting rotation of the receptacle (9), about a rotational axis (18), relative to the coupling element (6). A magnetically adhering body (24) is elastically connected to the receptacle (9) and magnetically connectable to the coupling element (6) for actuating the angle measuring device (13, 19).

15 Claims, 2 Drawing Sheets

COUPLING LOCK FOR A TRAILER COUPLING

This application is a national stage completion of PCT/DE2010/050038 filed Jun. 17, 2010, which claims priority from German Application Serial No. 10 2009 027 036.1 filed Jun. 19, 2009.

FIELD OF THE INVENTION

The invention concerns a coupling lock for a trailer coupling, with a receptacle in which a coupling element is or can be inserted and an angle measuring device connected with the receptacle, by means of which rotation of the receptacle relative to the coupling element about a rotational axis is or can be detected.

BACKGROUND OF THE INVENTION

A trailer coupling for a tractor/trailer combination as a rule comprises a coupling lock with a receptacle in which a coupling element can be inserted. The coupling lock and the coupling element form an articulated joint so that the tractor vehicle can pivot relative to the trailer vehicle, for example when the combination has to drive round a curve. In this case the coupling lock is fixed on one vehicle of the combination and the coupling element on the other vehicle thereof. If the tractor vehicle is a passenger automobile, then as a rule the coupling element is attached to the tractor vehicle and comprises a ball head, which engages in the receptacle of the coupling lock in the form of a ball socket, fixed on the towbar of the trailer vehicle. Until now no system that is sufficiently well developed for mass production has been available for sensing the pivot angle between the coupling element and the coupling lock, which is also referred to as the combination angle. In attempts to stabilize the combination, the combination angle is determined, for example, with an arrangement of cable potentiometers. These or other length measurement sensors (ultrasonic, laser, radar) measure the distance between the rear bumper of the tractor vehicle and a suitable front surface of the trailer vehicle. The distance is off-center relative to the vehicle and varies as a function of the combination angle. The translation length variation of the distance is converted by a computer into a rotational angle signal. The disadvantage of this is that owing to measuring equipment of this type the coupling and decoupling of the trailer vehicle is no longer possible, or much more difficult, since the measuring equipment comprises part-systems on both the tractor vehicle and the trailer, which are sometimes even connected together mechanically. Moreover, such measuring equipment is as a rule not suitable for operation under adverse environmental conditions (humidity, temperatures).

SUMMARY OF THE INVENTION

Starting from there, the purpose of the present invention is to further develop the coupling lock previously mentioned, in such manner that coupling and decoupling can be carried out simply.

The coupling lock according to the invention for a trailer coupling comprises a receptacle into which a coupling element is or can be inserted, an angle measuring device that is connected to the receptacle by means of which rotation of the receptacle relative to the coupling element about a rotational axis is or can be detected, and a magnetically adhering body elastically connected to the receptacle which, particularly in the coupled condition, adheres or can adhere magnetically to the coupling element and actuates or can actuate the angle measuring device.

In the coupled condition, i.e. in a condition when the coupling element is inserted into the receptacle, the adhering body adheres magnetically to the coupling element preferably in such manner that it transmits rotation of the coupling element relative to the receptacle about the rotational axis to the angle measuring device and/or to an actuating element of the angle measuring device, thereby actuating it. Thus, the angle measuring device can detect the rotation and pass it on to an evaluation unit, the rotation detected preferably being passed on to the evaluation unit in the form of one or more electric signals.

Preferably, when coupling takes place the connection between the magnetically adhering body and the coupling element is formed automatically by virtue of the magnetic attraction between the adhering body and the coupling element. In contrast, on decoupling the adhering body is preferably pulled away automatically from the coupling element. Thus, coupling and decoupling can be carried out relatively simply. Moreover, compared with a conventional coupling element the coupling element can preferably remain unchanged.

'Coupling onto' and/or just 'coupling' are understood to mean that the coupling element is brought into engagement with the receptacle, in particular inserted into it. 'Decoupling' is understood to mean that the coupling element is brought out of engagement with the receptacle, in particular removed therefrom.

In the coupled condition the magnetically adhering body sticks magnetically to the coupling element, in particular firmly enough for a rotationally fixed and/or solid body-to-body connection to form, or to be able to form, between the adhering body and the coupling element. This rotationally fixed connection is preferably a frictional connection, the force needed for the connection being brought to bear as a magnetic force by the magnetically adhering body. Since on account of uneven road conditions movements between the coupling element and the receptacle other than the rotation about the rotational axis can also take place, the magnetically adhering body is connected elastically to the receptacle. However, compared with the maximum rotation that takes place about the rotational axis, these other movements are relatively small.

The coupling element preferably consists of magnetic material, at least in the area where the magnetically adhering body sticks or can stick magnetically to the coupling element.

The rotational axis is preferably a vertical axis, in particular one extending in the direction of the vertical axis of the trailer vehicle and/or the tractor vehicle.

The elastic connection between the receptacle and the magnetically adhering body is preferably in the form of a holder, preferably an elastic holding fixture which, in particular, is elastic in the direction of the rotational axis. By virtue of the holder the magnetically adhering body is preferably held on the receptacle so that it can rotate about the rotational axis.

The holder preferably comprises a rotary bearing which holds the magnetically adhering body, allowing it to rotate, and/or preferably an elastic element, for example made of rubber or plastic, and/or in the form of a spring. Preferably, the rotary bearing is connected elastically to the receptacle by means of the elastic element. The elastic element is for example in the form of a bellows.

According to one design of the invention the rotary bearing comprises a bearing portion connected in a fixed manner, in particular materially-bonded with the elastic element, and a carrier mounted on the bearing and able to rotate about the rotational axis, which preferably carries the magnetically adhering body. The magnetically adhering body is preferably connected in a fixed manner, in particular solidly, to the carrier. To prevent the bearing portion and the carrier from moving out of engagement the carrier is secured, in particular axially, on the bearing portion. Here the term 'axial' means in particular the direction of the rotational axis. Preferably, the rotary bearing is a slide bearing.

The bearing portion preferably comprises a sleeve in which the carrier is preferably seated. In particular, the sleeve is a sliding sleeve or sliding bush, preferably of cylindrical form. Preferably, the sleeve has at least one radial projection which engages in a ring-shaped or partially ring-shaped recess of the carrier. In this case 'radial' means a direction perpendicular to the rotational axis. A plurality of radial projections can be provided on the sleeve around the rotational axis, which engage in the recess. Preferably however, the radial projection is ring-shaped. In particular, the radial projection is a projection extending inward. The sleeve consists for example of metal or plastic.

The angle measuring device preferably comprises a rotational angle sensor which is or can be actuated by the actuating element. The rotational angle sensor is preferably connected in a fixed manner, in particular solidly to the receptacle. Furthermore the actuating element is preferably connected fixed, in particular solidly to the magnetically adhering body.

In a further development of the invention, the angle measuring device comprises a measuring magnet preferably connected in a fixed manner and in particular solidly to the carrier, and a magnetic field sensor preferably connected fixed and in particular solidly to the receptacle, such that the field from the measuring magnet passes or can pass through the magnetic field sensor. The magnetic field sensor forms in particular the rotational angle sensor and the measuring magnet forms in particular the actuating element. However a converse arrangement is also possible, such that alternatively the angle measuring device comprises a measuring magnet preferably connected fixed and in particular solidly to the receptacle and a magnetic field sensor preferably connected fixed and in particular solidly to the carrier, through which the magnetic field from the measuring magnet passes or can pass.

In the coupled condition, rotation of the coupling element relative to the receptacle about the rotational axis causes the measuring magnet to rotate relative to the magnetic field sensor, in particular about the rotational axis, and this results in a variation of the magnetic field produced by the measuring magnet at the location of the magnetic field sensor. This change in magnetic field can be detected by the magnetic field sensor. In particular the measuring magnet is magnetized transversely to the rotational axis so that the change in magnetic field caused at the location of the magnetic field sensor by rotation is particularly clear. Preferably, the measuring magnet and the magnetic field sensor are arranged a distance apart along the rotational axis. A suitable magnetic field sensor is known, for example, from the documents EP 0 947 846 B1 and EP 1 182 461 A2.

So that the carrier interferes as little as possible with the magnetic field of the measuring magnet, the carrier is preferably made entirely or partially of a non-magnetic material. For example, the carrier consists of plastic, aluminum, magnesium or non-ferromagnetic steel. In such a case the measuring magnet can be attached directly on the carrier. Alternatively, the measuring magnet is attached to the carrier with interposition of a non-magnetic material such as plastic. In that case the carrier can even be made of a magnetic material. The measuring magnet is preferably a permanent magnet, but can also be an electromagnet.

So that the magnetic adhesion of the magnetically adhering body to the coupling element will be as firm as possible, the magnetically adhering body is orientated with one of its poles or with both poles toward the coupling element. The magnetically adhering body comprises an adhering magnet which is in particular a permanent magnet, but which can alternatively also be an electromagnet. In particular, the adhering magnet is magnetized in the direction of the rotational axis.

According to a preferred further development of the invention, the magnetically adhering body is made of a magnetic material in the form of a pot, which is open toward the coupling element and in which the adhering magnet sits. This makes it possible, by virtue of the pot rim that delimits the pot's opening, also to direct the pole of the adhering magnet that faces away from the coupling element toward the coupling element. Thereby, magnetic attraction of the magnetically adhering body to the coupling element is strengthened. The bottom of the pot is preferably in direct contact with the pole of the adhering magnet that faces away from the coupling element. Between the adhering magnet and the wall of the pot that surrounds it, a gap is preferably left, in particular an air gap, but which can also be entirely or partially filled with a non-magnetic material. This gap is in particular annular. The pot is preferably made of steel. The adhering magnet cannot rest directly against the coupling element. Preferably, however, the adhering magnet is set back relative to the pot rim that delimits the pot's opening, particularly with its pole facing toward the coupling element, so that the adhering magnet itself does not or cannot come directly in contact with the coupling element. This protects the adhering magnet against mechanical loads. In contrast the rim of the pot that delimits its opening preferably rests directly against the coupling element. The pot is preferably connected in a fixed manner and in particular solidly to the carrier.

The term 'magnet material' means any magnetic material. In particular, the term 'magnet material' means a ferromagnetic material. However, for example a ferrimagnetic material can also be used as the magnet material.

The coupling element is or can be inserted into the receptacle, in particular so that it can rotate about the rotational axis. Preferably, the coupling element is or can be inserted into the receptacle so that it can also pivot about at least one pivot axis that extends transverse to the rotational axis.

In a further development of the invention the coupling element has a ball head and the receptacle has a ball socket into which the ball head is or can be fitted. In particular, the ball head is or can be fitted into the ball socket in an articulated manner, so that the ball head and the ball socket form a spherical joint. Thus, the coupling lock according to the invention can be used together with a commonly available ball head for a trailer coupling for a passenger car. The ball head preferably has a diameter of 50 mm. Moreover, at its end pointing toward the ball socket, which is usually the top end of the ball head, the ball head preferably has a flat area against which the magnetically adhering body rests or can rest. This improves the magnetic connection between the magnetically adhering body and the ball head. In this context it is particularly advantageous that the flat area is as a rule already formed or commonly available ball heads. The ball head preferably consists of a magnetic material.

The receptacle can be fixed onto a tractor vehicle and the coupling element onto a trailer vehicle. However, it is preferable for the receptacle to be fixed to a trailer vehicle, in particular to its tow bar, and for the coupling element to be fixed on a tractor vehicle, in particular to its chassis or body. The tractor vehicle is preferably a motor vehicle, in particular a passenger car.

The angle measuring device is preferably connected electrically to an evaluation unit by means of which the rotational angle of the coupling element relative to the receptacle about the rotational axis can be determined. In particular, the bend angle of a combination consisting of the tractor vehicle and the trailer vehicle can be determined. Here, 'bend angle' is understood to mean, in particular, the angle between the longitudinal axis of the tractor vehicle and the longitudinal axis of the trailer vehicle, this bend angle lying, in particular, in a plane perpendicular to the rotational axis. For example if the longitudinal axis of the trailer vehicle lies in a plane perpendicular to the rotational axis, the bend angle is preferably the angle between the longitudinal axis of the trailer vehicle and the projection of the longitudinal axis of the tractor vehicle on the plane. The plane is as a rule parallel to the plane of the road.

According to a design of the invention, a towbar-side measurement of the combination angle (bend angle) is thus possible when the angle measuring device is fixed in the coupling lock on the trailer side. The angle measuring device is fitted centrally over the ball holder (receptacle or ball socket). Among other things this arrangement has a magnetically adhering body on the underside of the angle measuring device, which is connected by an elastic plastic component to a housing of the angle measuring device fixed on the receptacle. When the coupling lock is coupled with the coupling element the magnetically adhering body is brought close to the ball head. By virtue of the magnetic force of the magnetically adhering body a connection is formed between it and the ball head, so that from then on the magnetically adhering body is held firmly onto the ball head. The ball head has a standardized flat area on which the magnetically adhering body can rest. Thus, relative rotation between the ball head and the coupling lock is transferred to the angle measuring device. There, this relative rotation, which is predominantly rotation about a vertical axis (rotational axis) through the ball head, is detected unequivocally by a rotational angle sensor in the coupling lock. In particular, this rotational angle sensor is a magnetic field sensor. The rotational angle is detected by the sensor and passed on in the form of an electrical signal to an evaluation unit for further processing. On decoupling, the magnetically adhering body together with the coupling lock are automatically pulled clear of the ball head.

The invention provides the possibility of repetitive combination (bend) angle measurement. For example, the combination angle can be made available to systems for drive-dynamical stabilization of the combination and/or to driving assistance systems. Moreover, the vehicle's driver can be informed of the combination angle, for example by means of a display in the passenger compartment of the tractor vehicle. Bend angle fluctuations can also be detected, which can indicate an unstable condition of the combination (swinging).

The invention also pertains to a trailer coupling with a coupling lock according to the invention, such that the magnetically adhering body sticks magnetically to the coupling element and actuates or can actuate the angle measuring device.

Furthermore, the invention concerns the use of a coupling lock according to the invention for a trailer coupling between a tractor vehicle and a trailer vehicle, such that the magnetically adhering body sticks magnetically onto the coupling element and actuates the angle measuring device. In particular, from the rotation detected by the angle measuring device the bend angle between the longitudinal axis of the tractor vehicle and the longitudinal axis of the trailer vehicle is determined.

BRIEF DESCRIPTION OF THE DRAWINGS

Below, the invention is described with reference to a preferred embodiment illustrated in the drawings, which show.

DETAILED DESCRIPTION OF THE PREFERRED EMBODIMENTS

Figure 1:
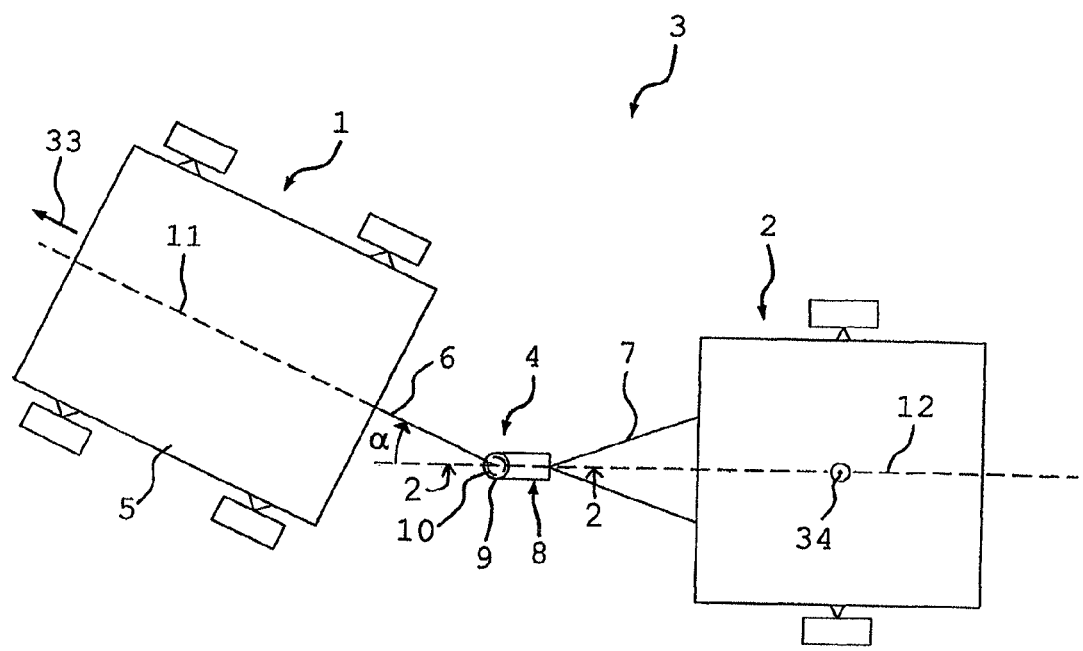
FIG. 1: A top view of a combination consisting of a tractor vehicle and a trailer vehicle.

FIG. 1 shows a top view of a combination 3 comprising a tractor vehicle 1 and a trailer vehicle 2, in which the tractor vehicle 1 is articulated to the trailer vehicle 2 by means of a trailer coupling 4. The normal forward driving direction of the tractor vehicle 1 and/or the combination 3 is indicated by the arrow 33. The trailer coupling 4 comprises a coupling element 6 connected solidly to the chassis or vehicle body 5 of the tractor vehicle 1 and a coupling lock 8 fixed onto a towbar 7 of the trailer vehicle 2.

The coupling lock 8 comprises a ball socket 9 into which a schematically represented ball head 10 of the coupling element 6 is fitted, such that the ball head 10 forms an end of the coupling element 6 at the rear thereof in relation to the driving direction 33. Furthermore, the coupling lock 8 forms a front end of the towbar 7 in the driving direction 33.

The angle a between the longitudinal axis 11 of the tractor vehicle 1 and the longitudinal axis 12 of the trailer vehicle 2 is the so-termed bend angle or combination angle. In particular, the bend angle a lies in a plane perpendicular to the vertical direction 34 of the trailer vehicle 2, the vertical direction 34 relative to the vehicle in FIG. 1 being perpendicular to the plane of the drawing.

Figure 2:
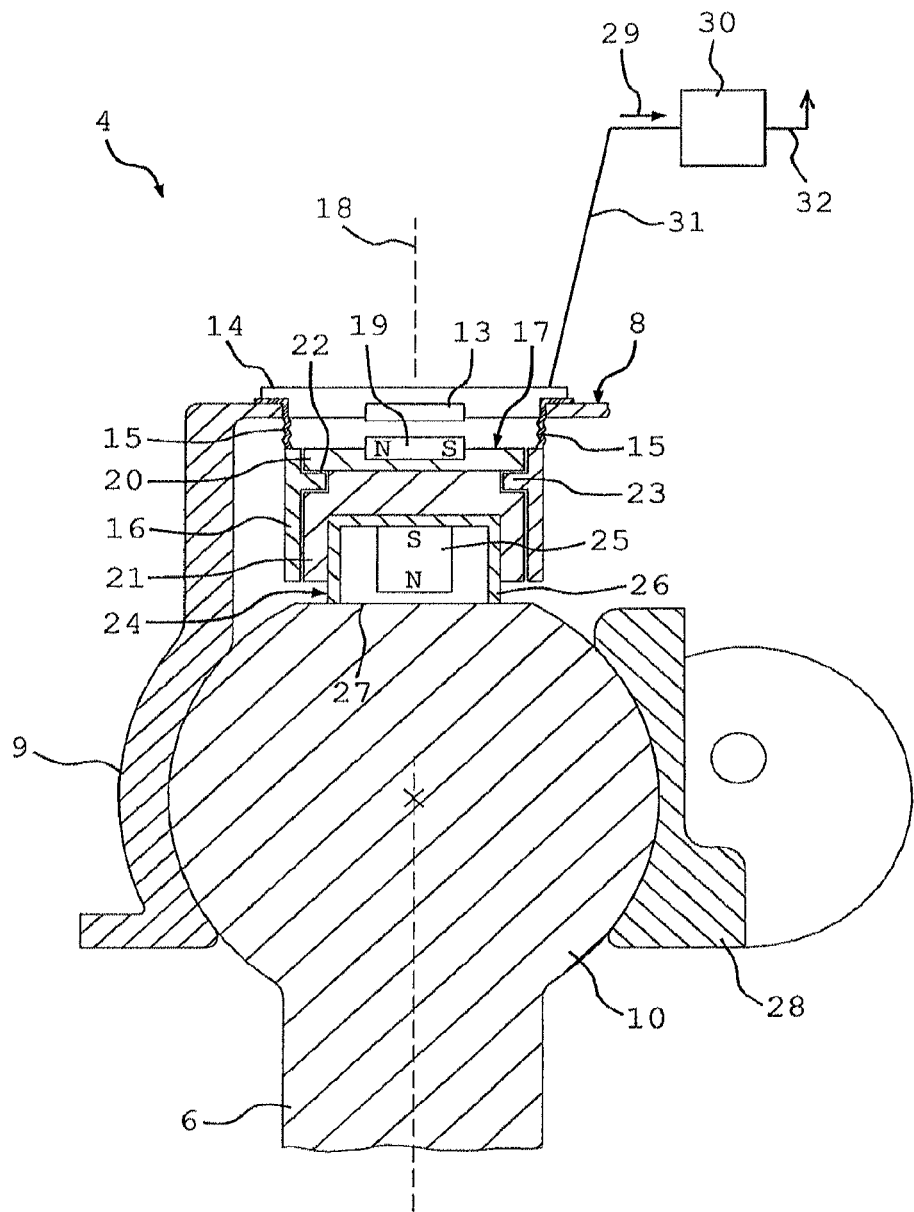
FIG. 2: A sectional view through the trailer coupling shown in FIG. 1, along the section line 2-2.

FIG. 2 shows a sectional view through the trailer coupling 4 along the longitudinal axis 12 and in the vehicle's vertical direction 34, wherein at the upper end of the ball socket 9 there is attached a magnetic field sensor 13 which is fixed by means of a housing 14. To the housing 14 is attached an elastic bellows 15, which supports a sliding sleeve 16 and is connected thereto in a materially-bonded manner. In the sliding sleeve 16 is fitted a carrier 17 which can rotate about a rotational axis 18, and which carries at its upper end facing toward the sensor 13 a measuring magnet 19 in the form of a permanent magnet. The north and south poles of the measuring magnet 19 are indicated, in order to make clear that the magnetization direction of the measuring magnet 19 is transverse to the rotational axis 18. The carrier 17, which is made from a non-magnetic material, has an upper portion 20 and a lower portion 21 mounted on the latter, an annular groove 22 being enclosed between the upper portion 20 and the lower portion 21, in which an annular, radially inward-extending projection 23 of the sliding sleeve 16 engages. Thus, the carrier 17 is secured onto the sliding sleeve 16 in the direction of the rotational axis 18. The rotational axis 18 extends in the vehicle's vertical direction 34 and so constitutes a vertical axis.

To the lower end of the carrier 17 facing toward the ball head 10 is fixed a magnetically adhering body 24 comprising a permanent magnet 25 and a pot 26 in which the magnet 25 sits. The north and south poles of the magnet 25 are indicated in order to make clear that it is magnetized in the direction of the rotational axis 18. The pot 26 consists of a magnetic material, so that the south pole of the magnet 25 appears at the rim of the pot 26 facing toward the ball head 10. Needless to say, the north and south poles can be exchanged.

The edge of the pot 26 rests against a flat area 27 of the ball head 10 and is held firmly onto it by magnetic force, since the ball head 10 too is made of a magnetic material. It can be seen that the north pole of the magnet 25 is slightly set back relative to the lower rim of the pot, so that direct contact between the magnet 25 and the ball head 10 is prevented. Moreover, an annular air gap is left between the magnet 25 and the wall of the pot 26 that surrounds it.

In addition the coupling lock 8 comprises a catch 28 that can be actuated, which is shown in the locked condition in FIG. 2, so that the ball head 10 is held positively in the ball socket 9. For decoupling, the catch 28 can be retracted so that the coupling lock 8 can be moved clear of the ball head 10. In this event the magnetically adhering body 24 is also and at the same time separated from the ball head 10.

In the coupled condition of the trailer coupling 4, if the ball head 10 rotates about the rotational axis 18 relative to the coupling lock 8 the magnetically adhering body 24 rotates together with the ball head 10. Since the magnetically adhering body 24 is connected by means of the carrier 17 to the measuring magnet 19 in a rotationally fixed manner, the measuring magnet 19 too rotates with the ball head 10 about the rotational axis 18. the rotation can be detected by the sensor 13, which then emits an electrical signal 29 that characterizes the rotation to an evaluation unit 30 to which the sensor 13 is connected by electric leads 31. On the basis of the electric signal 29 the bend angle a is determined by the evaluation unit 30.

According to a first alternative the evaluation unit 30 is located in the tractor vehicle 1, so the lead 31 extends from the coupling lock 8 to the tractor vehicle 1. In a second alternative the evaluation unit 30 is in the trailer vehicle 2, which is coupled electrically by leads 32 to the tractor vehicle 1. In the latter case the information about the bend angle a can be made available to the tractor vehicle 1 via the electric leads 32.

In a variant embodiment the communication between the sensor 13 and the evaluation unit 30 and/or between the evaluation unit 30 and the tractor vehicle 1 can take place by wireless means, for example by radio.

If because of uneven road conditions movements occur between the coupling lock 8 and the ball head 10 which deviate from rotation about the rotational axis 18, for example tilting movements between the tractor vehicle 1 and the trailer vehicle 2, then such deviant movements are accommodated by the elastic bellows 15 so that the angle measuring device or the arrangement comprising the magnetic field sensor 13, elastic bellows 15, sliding sleeve 16, carrier 17, measuring magnet 19 and magnetically adhering body 24 is not damaged.

LIST OF INDEXES

1 Tractor vehicle
2 Trailer vehicle
3 Combination
4 Trailer coupling
5 Chassis of the tractor vehicle
6 Coupling element
7 Towbar of the trailer vehicle
8 Coupling lock
9 Ball socket
10 Ball head
11 Longitudinal axis of the tractor vehicle
12 Longitudinal axis of the trailer vehicle
13 Magnetic field sensor
14 Housing of the magnetic field sensor
15 Elastic bellows
16 Sliding sleeve
17 Carrier
18 Rotational axis
19 Measuring magnet
20 Upper portion of the carrier
21 Lower portion of the carrier
22 Annular groove in the carrier
23 Radial projection in the sliding sleeve
24 Magnetically adhering body
25 Adhering magnet
26 Pot
27 Flat area
28 Catch
29 Signal from the magnetic field sensor
30 Evaluation unit
31 Electric connection lead
32 Electric connection lead
33 Driving direction
34 Vertical direction of the vehicle

The invention claimed is:

1. A coupling lock, for a trailer coupling, comprising:
a receptacle (9) in which a coupling element (6) is inserted,
an angle measuring device (13, 19) being connected to the receptacle (9), and the angle measuring device (13, 19) detecting rotation of the receptacle (9), about a rotational axis (18), relative to the coupling element (6),
a magnetically adhering body (24) being elastically connected to the receptacle (9) and magnetically connectable to the coupling element (6) for actuating the angle measuring device (13, 19).

2. The coupling lock according to claim 1, wherein the magnetically adhering body (24) is mounted, via an elastic holder (15, 16, 17), on the receptacle (9) such that the magnetically adhering body (24) is rotatable about the rotational axis (18).

3. The coupling lock according to claim 2, wherein the elastic holder (15, 16, 17) comprises a rotary bearing (16, 17) that holds the magnetically adhering body (24) so that the magnetically adhering body (24) is rotatable, and an elastic body (15) by which the rotary bearing (16, 17) is connected elastically to the receptacle (9).

4. The coupling lock according to claim 3, wherein the rotary bearing (16, 17) comprises a bearing portion (16) connected firmly to the elastic body (15) and a carrier portion (17) mounted for rotation thereon about the rotational axis (18), which is axially secured to the bearing portion (16) and which carries the magnetically adhering body (24).

5. The coupling lock according to claim 4, wherein the bearing portion (16) comprises a sliding sleeve with at least one radial projection (23) which engages in an annular recess (22) of the carrier portion (17) fitted into the sliding sleeve.

6. The coupling lock according to claim 4, wherein the angle measuring device (13, 19) comprises a measuring magnet (19) firmly connected to the carrier (17) and a magnetic field sensor (13) firmly connected to the receptacle (9), through which the magnetic field of the measuring magnet (19) passes.

7. The coupling lock according to claim 4, wherein the measuring magnet (19) is magnetized transversely to the rotational axis (18).

8. The coupling lock according to claim 4, wherein the carrier (17) comprises a non-magnetic material.

9. The coupling lock according to claim 1, wherein the magnetically adhering body (24) comprises a pot (26) made of a magnetic material which is open toward the coupling element (6) and in which an adhering magnet (25) is fitted.

10. The coupling lock according to claim 9, wherein the adhering magnet (25) is set back relative to a rim of the pot (26) that delimits an opening of the pot.

11. The coupling lock according to claim 1, wherein the coupling element (6) comprises a ball head (10) and the receptacle (9) comprises a ball socket into which the ball head (10) fits.

12. The coupling lock according to claim 11, wherein an end of the ball head (10), facing toward the ball socket (9), has a flat area (27) against which the magnetically adhering body (24) rests.

13. The coupling lock according to claim 1, wherein the receptacle (9) is fixed on a towbar (7) of a trailer vehicle (2) and the coupling element (6) is fixed to one of a chassis and a body (5) of a tractor vehicle (1).

14. The coupling lock according to claim 13, wherein an evaluation unit (30) is electrically connected to the angle measuring device (13, 19) by which a bend angle ($\alpha$), between a longitudinal axis (11) of the tractor vehicle (1) and a longitudinal axis (12) of the trailer vehicle (2), is determined.

15. A coupling lock (8) in combination with a trailer coupling (4) located between a tractor vehicle (1) and a trailer vehicle (2), the coupling lock (8) comprising:
- a receptacle (9) in which a coupling element (6) is inserted,
- an angle measuring device (13, 19) connected to the receptacle (9), and the angle measuring device (13, 19) detecting rotation of the receptacle (9), about a rotational axis (18), relative to the coupling element (6),
- a magnetically adhering body (24) being elastically connected to the receptacle (9) and magnetically adhering to the coupling element (6) and for actuating the angle measuring device (13, 19) such that a bend angle ($\alpha$), between a longitudinal axis (11) of the tractor vehicle (1) and a longitudinal axis (12) of the trailer vehicle (2), is determined from rotation detected by the angle measuring device.

* * * * *